(12) United States Patent
Morrie

(10) Patent No.: US 10,729,057 B2
(45) Date of Patent: Aug. 4, 2020

(54) INTEGRATED UPRIGHT HEADER TRANSPORT FOR AN AGRICULTURAL COMBINE

(71) Applicant: CNH Industrial America LLC, New Holland, PA (US)

(72) Inventor: Luke Morrie, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/205,554

(22) Filed: Nov. 30, 2018

(65) Prior Publication Data

US 2020/0170172 A1 Jun. 4, 2020

(51) Int. Cl.
*B60P 1/00* (2006.01)
*A01B 73/00* (2006.01)

(52) U.S. Cl.
CPC .................................... *A01B 73/00* (2013.01)

(58) Field of Classification Search
CPC ........ A01B 73/00; A01D 75/002; B60P 3/066
See application file for complete search history.

(56) References Cited

U.S. PATENT DOCUMENTS

| | | |
|---|---|---|
| 4,106,788 A | 8/1978 | Bohnert |
| 4,223,741 A | 9/1980 | Blumhardt |
| 4,435,948 A | 3/1984 | Jennings |
| 4,821,811 A | 4/1989 | Swenson |
| 5,031,394 A | 7/1991 | Honey |
| 5,243,810 A | 9/1993 | Fox et al. |
| 6,209,297 B1* | 4/2001 | Yeomans ............. A01B 73/005 56/14.9 |
| 6,419,431 B1* | 7/2002 | Kuhns ................. A01D 75/002 410/156 |
| 6,428,047 B1 | 8/2002 | Kaderabek |
| 7,552,579 B2 | 6/2009 | Tippery et al. |
| 7,931,429 B2 | 4/2011 | Nübel et al. |
| 8,292,328 B2* | 10/2012 | Honas ................ A01D 75/002 280/769 |

(Continued)

FOREIGN PATENT DOCUMENTS

| | | |
|---|---|---|
| CA | 1188899 A | 6/1985 |
| EP | 1 066 744 A1 | 1/2001 |

(Continued)

OTHER PUBLICATIONS

Extended European Search Report for EP Application No. 19212241.4 dated May 6, 2020 (five pages).

*Primary Examiner* — Brian L Swenson
(74) *Attorney, Agent, or Firm* — Peter Zacharias; Patrick Sheldrake

(57) ABSTRACT

An integrated transport system for an agricultural harvesting header that pivotable rotates the agricultural harvesting header from a working position to a transport position allowing the agricultural harvesting header to be transported in a substantially vertical position. The agricultural harvesting header includes at least one actuator to pivotable move the agricultural harvesting header from the working position to the transport position and at least one transport wheel. The agricultural harvesting header may be further provided with gauge wheels being repositionable for use as a the at least one transport wheel.

20 Claims, 6 Drawing Sheets

(56) References Cited

U.S. PATENT DOCUMENTS

| | | | | |
|---|---|---|---|---|
| 8,616,812 B2* | 12/2013 | Bergen | ................ | A01D 75/002 |
| | | | | 280/789 |
| 8,714,594 B1* | 5/2014 | Hellbusch | ............ | A01D 75/002 |
| | | | | 280/140 |
| 8,740,249 B1* | 6/2014 | Hellbusch | ............ | A01D 75/002 |
| | | | | 280/140 |
| 9,527,539 B1* | 12/2016 | Hellbusch | ............ | B62D 63/061 |
| 9,596,807 B2* | 3/2017 | Numberg | ............ | A01D 75/002 |

FOREIGN PATENT DOCUMENTS

| EP | 1366650 A1 | 12/2003 |
|---|---|---|
| EP | 1905294 A1 | 4/2008 |

\* cited by examiner

INTEGRATED UPRIGHT HEADER TRANSPORT FOR AN AGRICULTURAL COMBINE

BACKGROUND OF THE INVENTION

1. Field of the Invention

The present invention relates to agricultural combine headers, and, more particularly, to transportation of a combine header.

2. Description of the Related Art

An agricultural harvester known as a "combine" is historically termed such because it combines multiple harvesting functions, such as picking, threshing, separating, and cleaning, in a single harvesting unit. Generally, a combine includes a chassis, a prime mover, a feeder housing, a header removably attached to the feeder housing for removing the crop from a field, a threshing system, and a cleaning system. The threshing system may include an axially displaced threshing rotor and a perforated rotor housing, which can be composed of adjustable concaves. The threshing rotor is provided with rasp bars that interact with the crop material, and as the threshing rotor rotates within the rotor housing the threshing rotor performs a threshing operation on the crop material to remove the grain and provides positive crop movement. Once the grain is threshed, the grain falls through the perforations in the rotor housing and is subsequently cleaned by the cleaning system. The cleaning system includes a cleaning fan which blows air through oscillating sieves to discharge chaff and other debris toward the rear of the combine. Non-grain crop material or material other than grain (MOG), such as straw, from the threshing and cleaning systems proceeds through a straw chopper and out the rear of the combine. Clean grain is transported, by a clean grain auger, to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a header are specifically optimized to harvest a particular kind of crop material. For instance, the header may be in the form of a draper header which has a cutter bar, a draper belt, and a rotating reel with tines or the like in order to harvest a bushy or fluffy crop material, such as soy beans or canola. Alternatively, the header may be in the form of a corn header which includes an auger and row units with snouts, gathering chains, and stalk rolls in order to harvest corn.

Transporting modern headers from one harvesting location to another may be arduous. Given the increased capacity, size, and weight of modern headers, modern headers generally must be detached from the combine and transported lengthwise to conform to relatively narrow roadways. To transport a header, a separate transport trailer can be used to support the header or the header itself may additionally include a transport assembly attached to the header frame. As can be appreciated, the header transport trailer can be suboptimal as an operator must purchase and maintain an additional piece of equipment in addition to the header. On the other hand, a transport assembly can be advantageous as it is integrated into the header frame.

A typical transport assembly includes an attachment device, such as a tongue, at one end of the header and a pair of pivoting or removable wheels positioned adjacent to the other end of the header. Pivoting wheels are generally permanently attached to the header and move between a transport position, in which the wheels are located underneath the header, and a harvesting position, in which the wheels are tucked behind the rear of the header frame. For example, an actuator, such as a motor, may pivot an arm which in turn mounts the wheels. In such a configuration, a header may remain attached to the combine as the wheels pivot between the transport and harvesting positions. However, if there is insufficient ground clearance, the arm may not have enough operational clearance to transition the tires between the two operating positions. Further, if the wheels undesirably contact the ground during a transitional period, the wheels, swing arm, actuator, and/or other structural members of the header may become damaged. Removable wheels can be detached from an axle mount of the header transport assembly for harvesting the crop material and can be reattached to the axle mount for transportation. In the detachable wheel configuration, an operator may need to manually detach the wheels from the header. Hence, removable wheels may not be desired as some wheels may be cumbersome and time-consuming to remove and reattach.

What is needed in the art is a cost-effective and easy-to-operate transport assembly for a combine header.

SUMMARY OF THE INVENTION

In one exemplary embodiment formed in accordance with the present invention, there is provided an integrated transport arrangement for an agricultural harvesting header. The integrated transport arrangement includes a main header frame having a plurality of main header frame members vertically extending along a rear side of the main frame header. A plurality of main header beams horizontally extend along the rear side of the main header frame. A cylinder pivot point may be formed on the main header frame. A lower mount bar extends substantially parallel to the plurality of main header beams. A plurality of transport wheels may be attached to at least one side of the main header frame and are configured to engage a ground surface when the main header frame is at a transport height in a transport position. At least one fore/aft pivot frame member includes a top end forming at least one main header frame pivot point and a bottom end pivotably attached to the lower mount bar. The at least one main header frame pivot point forms a pivot axis substantially parallel to the plurality of main header beams. The main header frame may be configured to move between a working position and the transport position about the pivot axis. At least one fore/aft actuator with a first end may be attached to the cylinder pivot point and a second end attached pivotably to the lower mount bar. The at least one fore/aft actuator may be configured to pivot the main header frame about the pivot axis in such a manner that the main header frame is rotated between the working position and the transport position.

In another exemplary embodiment formed in accordance with the present invention, there is a method for transporting an agricultural harvesting header. The method includes the steps of: providing an agricultural harvesting header as configured in an exemplary embodiment; raising the agricultural harvesting header to a first position; extending the at least one fore/aft actuator for moving the agricultural harvesting header to an upright position; deploying the plurality of transport wheels to a transporting position; lowering the agricultural harvesting header to a second position; and retracting the at least one fore/aft actuator.

An advantage of the present invention is that the header may be transported in a vertical orientation without the use of a separate trailer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "horizontal", "vertical", "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
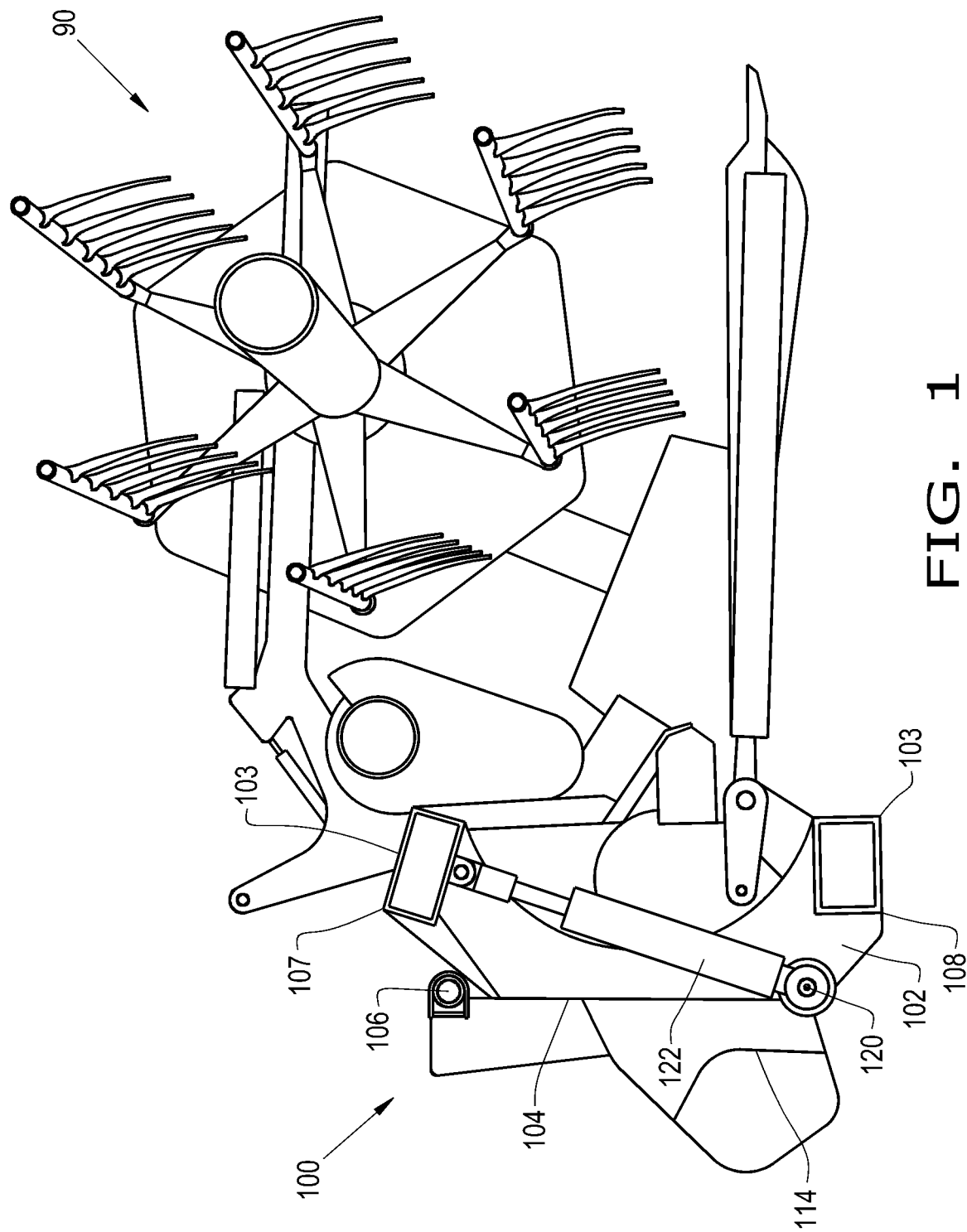
FIG. 1 is an end perspective view of an embodiment of an agricultural harvesting header with a transport arrangement.

Referring now to the drawings, and more particularly to FIG. 1, there is shown an agricultural harvesting header 90 with an integrated transport arrangement 100 in a working position. The integrated transport arrangement 100 has a main header frame 102 with a plurality of main header frame members 103 arranged vertically and a plurality of main header beams 104 arranged horizontally and extending transversely along a rear side 106 of the main header frame 102. The working position of the integrated transport arrangement 100 is defined as being in an orientation where a top side 107 and a bottom side 108 of the main header frame 102 are substantially horizontal to a ground surface and a rear surface of the main header frame 102 is substantially vertical to the ground surface. The transport position of the integrated transport arrangement 100 is defined as being an orientation where the rear surface of the main header frame 102 forms an angle of less than 45° with a ground surface, and more particularly less than 30°. The embodiment shown in FIG. 2 is approximately 15°.

Figure 2:
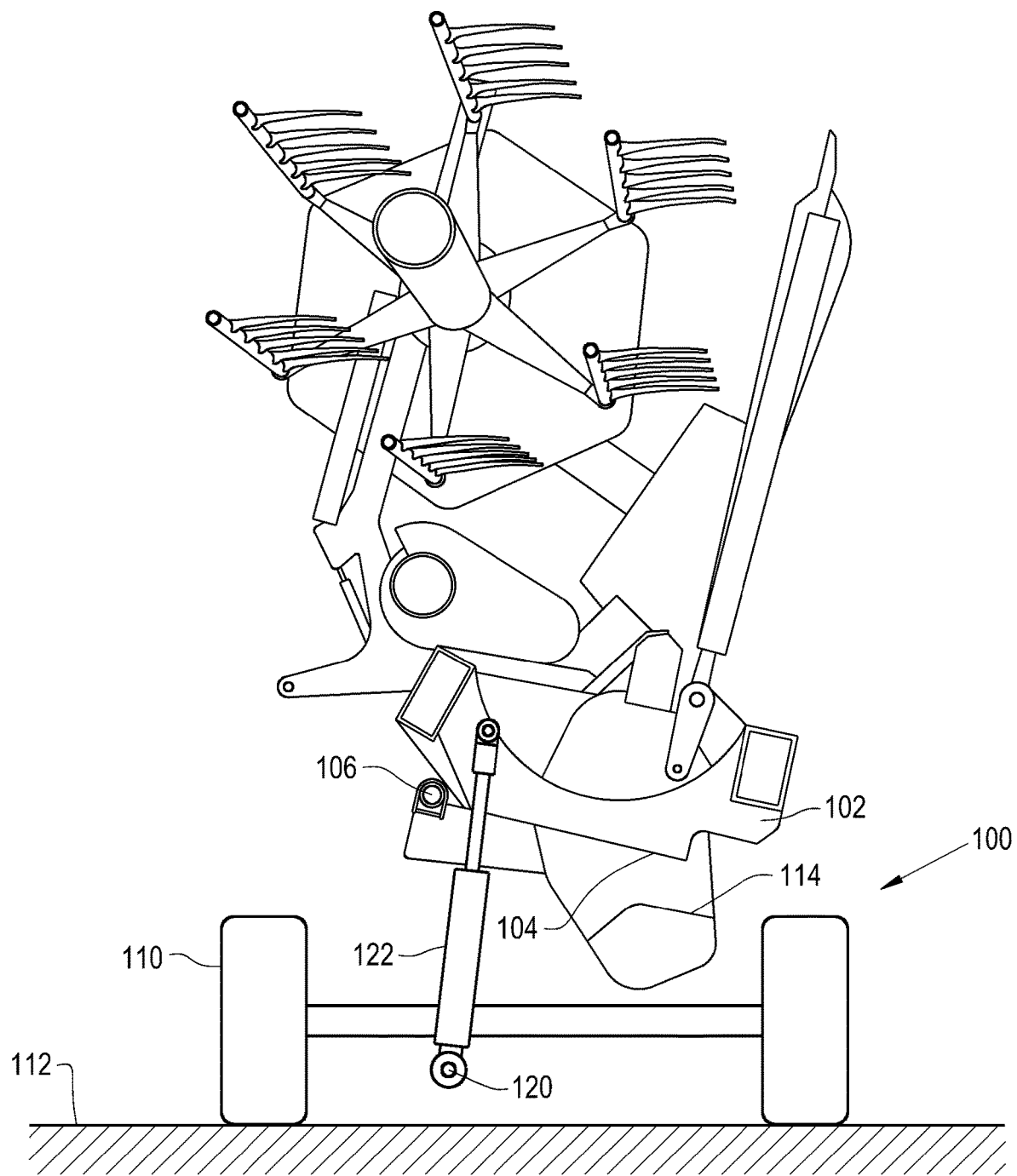
FIG. 2 is another end perspective view of the agricultural harvesting header shown in FIG. 1.

Referring now to FIG. 2, the integrated transport arrangement 100 may include a plurality of transport wheels 110 attaching to at least one side main header frame 102. The plurality of transport wheels 110 may be permanently attached, such as being welded or formed integral with the main header frame 102. The plurality of transport wheels 110 may also be removably attached with elements such as bolts or hitch pins. The plurality of transport wheels 110 are configured to engage the ground surface and disconnect the integrated transport arrangement 100 from a cradle of the agricultural harvester (not shown) when the integrated transport arrangement 100 is lowered to a transport height while in the transport position.

Figure 3:
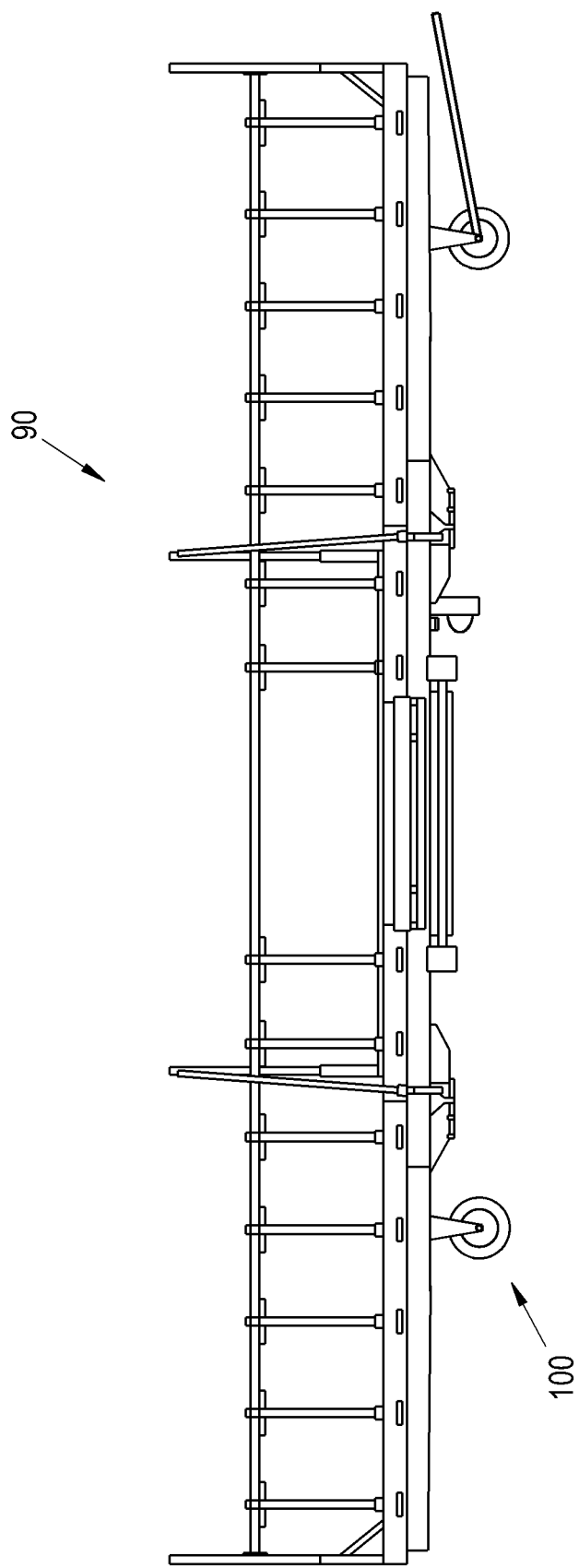
FIG. 3 is a rear view of the transport arrangement shown in FIGS. 1 and 2.

FIG. 3 shows a rear view of the embodiment shown in FIG. 2 with a drawbar attached for transporting.

Figure 4:
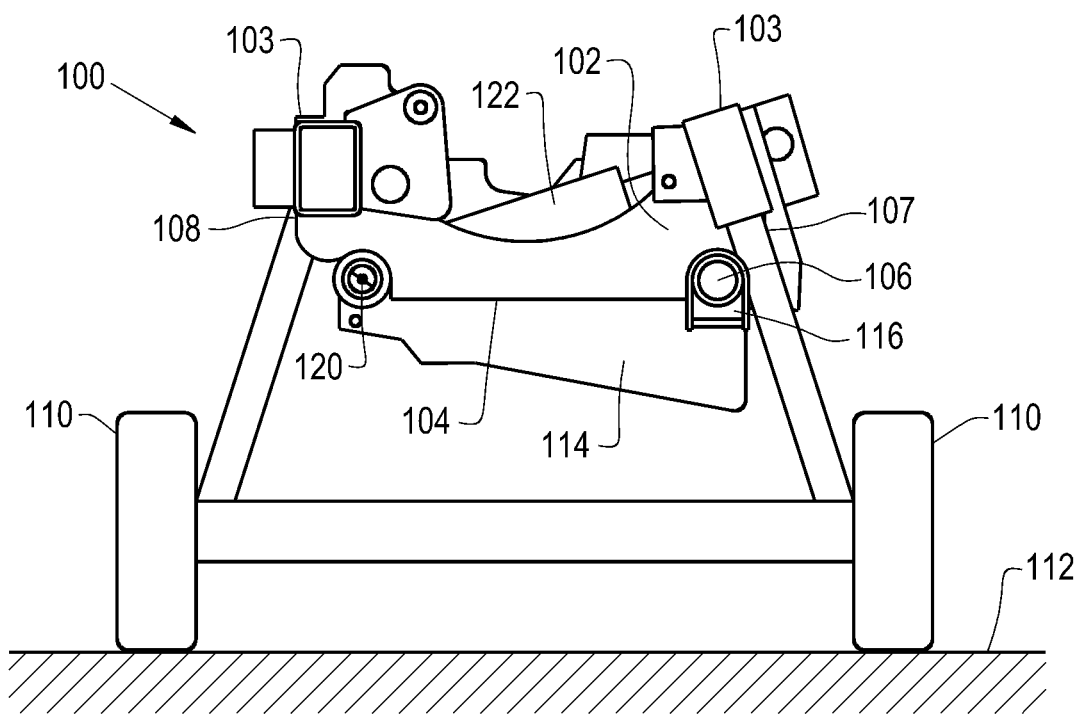
FIG. 4 is an end view of the transport arrangement shown in FIGS. 1 and 2, with portions of the header removed for illustration.

Referring now to FIG. 4, the integrated transport arrangement 100 is shown in a transport position. The integrated transport arrangement 100 may include at least one fore/aft pivot frame member 114 forming at least one main header frame pivot point 115 at a location near a top end 116 of the at least one fore/aft pivot frame member 114. The location of the at least one main header frame pivot point 115 may be configured to provide a transport position where the rear surface of the main header frame 102 forms an angle of less than 45° with a ground surface, and more particularly less than 30°. The embodiment shown in FIG. 2 is approximately 15°.

The at least one main header frame pivot point 115 forms a pivot axis 117 extending along the rear side 104 of the main header frame 102 and parallel to the main header beams 104. The main header frame 102 is configured to pivot about the at least one main header frame pivot point 115 between a working position and a transport position. The at least one main header frame pivot point 115 may include any element or elements that are suited for rotation such as a shaft and bushing, ball bearings, roller bearings or hydrostatic bearings and may be formed integral with or attached to the at least one fore/aft pivot frame member 114.

Figure 5:
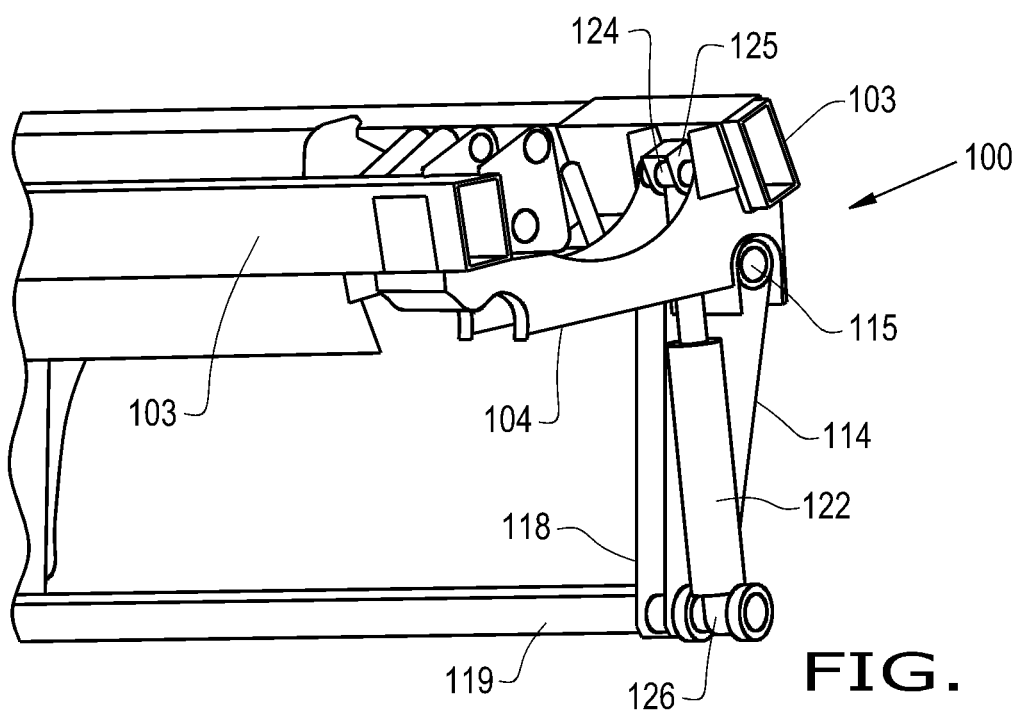
FIG. 5 is a perspective view of the transport arrangement shown in FIG. 4.

FIG. 5 shows the at least one fore/aft pivot frame member 114 further including a bottom end 118 pivotably attached to a lower mount bar 119. The lower mount bar 119 forms a second rotation axis 120 extending along the rear side of the integrated transport arrangement 100 parallel to the main header frame members 103. The integrated transport arrangement 100 further includes at least one fore/aft actuator 122 with a first end 124 that pivotably attaches to the main header frame 102 at a cylinder pivot point 125. The cylinder pivot point 125 may be formed integral with or attached to the main header frame 102. Cylinder pivot point 125 may be formed on at least one of the plurality of main header frame members 103 or on at least one of the plurality of main header beams 104. The at least one fore/aft actuator 122 further includes a second end 126 that may pivotably attach to the lower bar mount 119 about the second axis of rotation 120. The first end 124 and the second end 126 may be attached with any element or elements that are suited for rotation such as a shaft and bushing, ball bearing, roller bearing or hydrostatic bearing. The at least one fore/aft actuator 122 may be electromechanical or hydraulic and may include elements such as cylinders, ball screws, geared drives or belts. Extending the at least one fore/aft actuator 122 places the integrated transport arrangement 100 into a position where the plurality of transport wheels 110 may be attached, removed or moved between a transport and working position. Retracting the at least one fore/aft actuator 122 disengages the integrated transport arrangement 100 from the cradle of the agricultural harvester when the plurality of transport wheels 110 are attached and in the transport position. Retracting the at least one fore/aft actuator 122 engages the integrated transport arrangement 100 with the cradle of the agricultural harvester when the plurality of transport wheels 110 are unattached or stowed in a working position.

Figure 6:
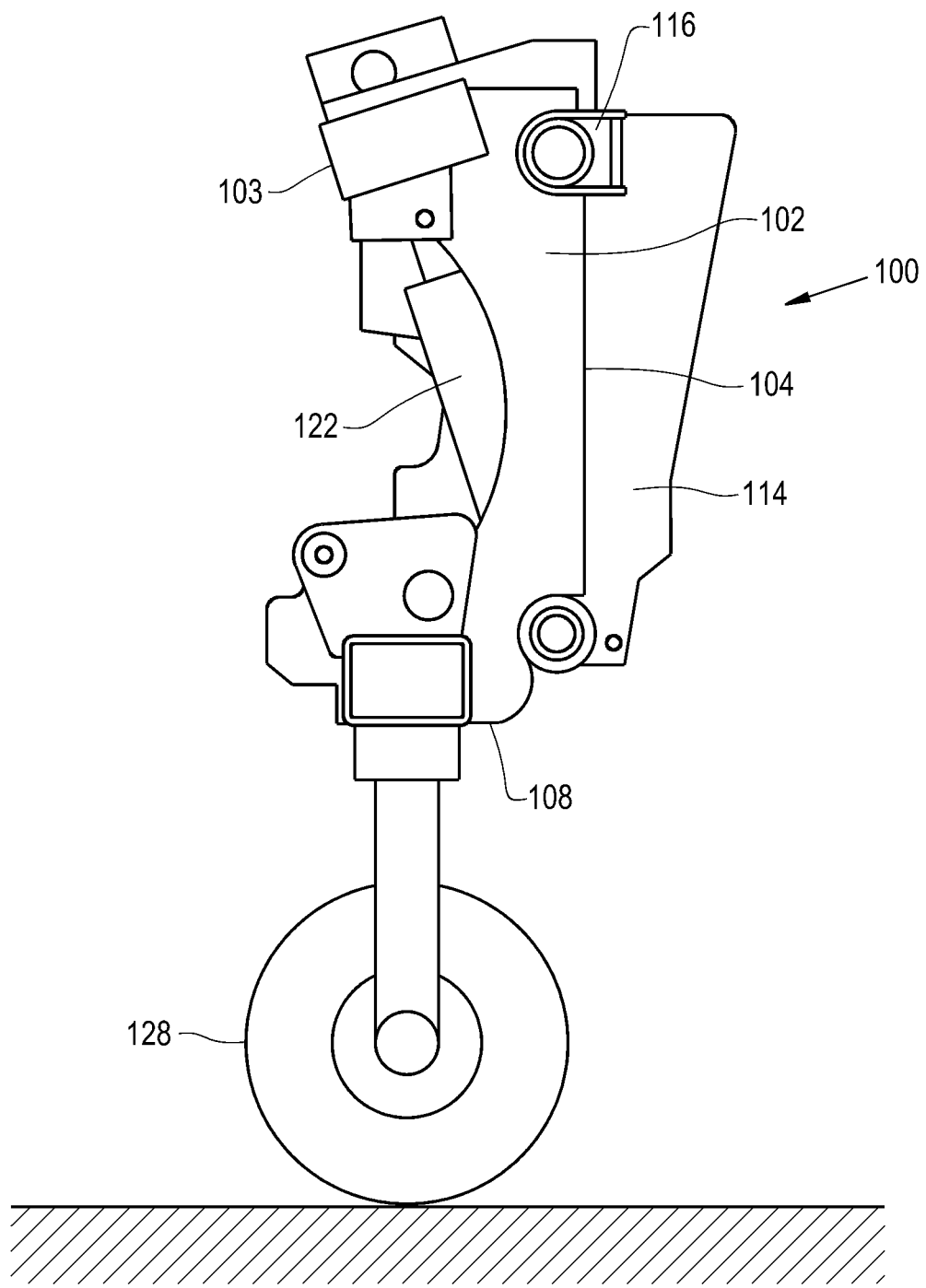
FIG. 6 is another end view of the transport arrangement shown in FIG. 4 in a transport position.

According to another aspect of the present invention, and referring now to FIG. 6, there is shown the same embodiment of the integrated transport arrangement 100 for an agricultural harvesting header in a working position. The integrated transport arrangement 100 may include a plurality of gauge wheels 128 when in a working position. At least one of the plurality of gauge wheels 128 may be reconfigured to be used as at least one of the plurality of transport wheels 110.

Figure 7:
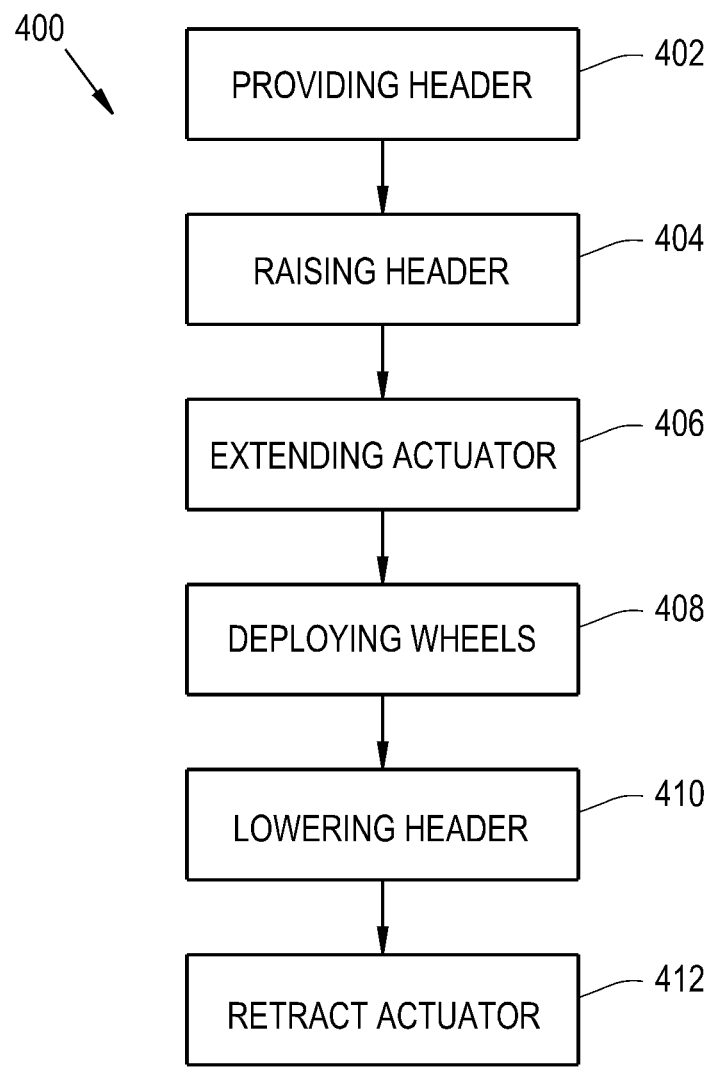
FIG. 7 is a flowchart of an embodiment of a method of transporting an agricultural harvesting header.

In accordance with an exemplary embodiment of a method 400 of the present invention. Referring now to FIG. 7, there is shown a method 400 for transporting an agricultural harvesting header. An agricultural harvesting header with an integrated transport arrangement is configured to move from a lowered position to a raised position and to pivot about a pivot axis extending along a rear side of the integrated transport arrangement in such a manner that the integrated transport arrangement is rotatable from a working position into a transport position (step 402). The integrated transport arrangement includes a plurality of transport wheels being attached to at least one side of the main header frame and are configured to engage a ground surface when the integrated transport arrangement is at a transport height in the transport position. The integrated transport arrangement also includes at least one fore/aft pivot frame member having a top end forming a pivot axis and a bottom end pivotably attaching to a lower mount bar about a second rotation axis extending along a rear side of the integrated transport arrangement and further includes at least one fore/aft actuator with a first end attaching pivotably to the main header frame pivot point and a second end attaching pivotably to the lower mount bar about the second axis of rotation. The integrated transport arrangement is then moved to a first position with a device such as agricultural harvester (step 404). The at least one fore/aft actuator is extended to move the integrated transport arrangement into an upright position (step 406). The plurality of transport wheels are then deployed to a transport position (step 408). The integrated transport arrangement is then moved to a second position where the lower mount bar disengages from the cradle of the agricultural harvester (step 410). The at least one fore/aft actuator is retracted to move the integrated transport arrangement into the working position (step 412).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An integrated transport arrangement for an agricultural harvesting header, comprising:
   a main header frame having at least one main header frame member vertically extending along a rear side of the main frame header, at least one main header beam horizontally extending along the rear side of the main header frame, and a cylinder pivot point formed on the main header frame;
   a lower mount bar extending substantially parallel to the at least one main header frame member;
   a plurality of transport wheels attaching to at least one side of the main header frame and configured to engage a ground surface when the main header frame is at a transport height in a transport position;
   at least one fore/aft pivot frame member having a top end forming at least one main header frame pivot point and a bottom end pivotably attaching to the lower mount bar, the at least one main header frame pivot point forming a pivot axis substantially parallel to the at least one main header beam, the main header frame being configured to move between a working position and the transport position about the pivot axis; and
   at least one fore/aft actuator with a first end attaching to the cylinder pivot point and a second end attaching pivotably to the lower mount bar, the at least one fore/aft actuator configured to pivot the main header frame about the pivot axis in such a manner that the main header frame is rotated between the working position and the transport position, and vice-versa.

2. The integrated transport arrangement of claim 1, wherein the at least one main header frame pivot point is configured to align the rear surface of the main header frame with the ground surface to form an angle of less than 45° when the main header frame is in the transport position.

3. The integrated transport arrangement of claim 1, wherein the at least one main header frame pivot point is configured to align the rear surface of the main header frame with the ground surface to form an angle of less than 30° when the main header frame is in the transport position.

4. The integrated transport arrangement of claim 1, wherein the at least one main header frame pivot point is configured to align the rear surface of the main header frame with the ground surface to form an angle of approximately 15° when the main header frame is in the transport position.

5. The integrated transport arrangement of claim 1, wherein the at least one main header frame pivot point is attached to the at least one fore/aft pivot frame member.

6. The integrated transport arrangement of claim 1, wherein the cylinder pivot point is attached to the main header frame.

7. The integrated transport arrangement of claim 1, wherein the cylinder pivot point is formed on the at least one main header frame member.

8. The integrated transport arrangement of claim 1, wherein the cylinder pivot point is formed on the at least one main header beam.

9. The transport arrangement of claim 1, wherein the plurality of transport wheels are removably attached to the main header frame.

10. The transport arrangement of claim 1, wherein the plurality of transport wheels are permanently attached to the main header frame.

11. The transport arrangement of claim 1, wherein the at least one fore/aft actuator is a hydraulic cylinder.

12. The transport arrangement of claim 1, wherein at least one gauge wheel is configured to be used as at least one of the plurality of transport wheels.

13. A method for transporting an agricultural harvesting header, comprising:
   providing a main header frame having at least one main header frame member vertically extending along a rear side of the main frame header, at least one main header beam horizontally extending along the rear side of the main header frame, and a cylinder pivot point formed on the main header frame, a lower mount bar extending substantially parallel to the at least one main header frame member, a plurality of transport wheels attaching to at least one side of the main header frame and configured to engage a ground surface when the main header frame is at a transport height in a transport position, at least one fore/aft pivot frame member having a top end forming at least one main header frame pivot point and a bottom end pivotably attaching to the lower mount bar, the at least one main header frame pivot point forming a pivot axis substantially parallel to the at least one main header beam, the main header frame being configured to move between a working position and the transport position about the pivot axis, and at least one fore/aft actuator with a first end attaching to the cylinder pivot point and a second end attaching pivotably to the lower mount bar, the at least one fore/aft actuator configured to pivot the main header frame about the pivot axis in such a manner that the main header frame is rotated between the working position and the transport position;

raising the agricultural harvesting header to a first position;

extending the at least one fore/aft actuator for moving the agricultural harvesting header to an upright position;

deploying the plurality of transport wheels to the transport position;

lowering the agricultural harvesting header to a second position; and retracting the at least one fore/aft actuator for moving the agricultural harvesting header to the working position.

14. The method of claim 13, wherein the at least one main header frame pivot point is configured to align the rear surface of the main header frame with the ground surface to form an angle of less than 45° when the main header frame is in the transport position.

15. The method of claim 13, wherein the at least one main header frame pivot point is configured to align the rear surface of the main header frame with the ground surface to form an angle of less than 30° when the main header frame is in the transport position.

16. The method of claim 13, wherein the at least one main header frame pivot point is configured to align the rear surface of the main header frame with the ground surface to form an angle of approximately 15° when the main header frame is in the transport position.

17. The method of claim 13, wherein the at least one main header frame pivot point is attached to the at least one fore/aft pivot frame member.

18. The method of claim 13, wherein the cylinder pivot point is attached to the main header frame.

19. The method of claim 13, wherein the cylinder pivot point is formed on the at least one main header frame member.

20. The method of claim 13, wherein the cylinder pivot point is formed on the at least one main header beam.

* * * * *